July 24, 1934.    M. F. GANNETT    1,967,302
HYDRAULIC TURBINE
Filed March 11, 1933    4 Sheets-Sheet 2

INVENTOR
Malcolm F. Gannett

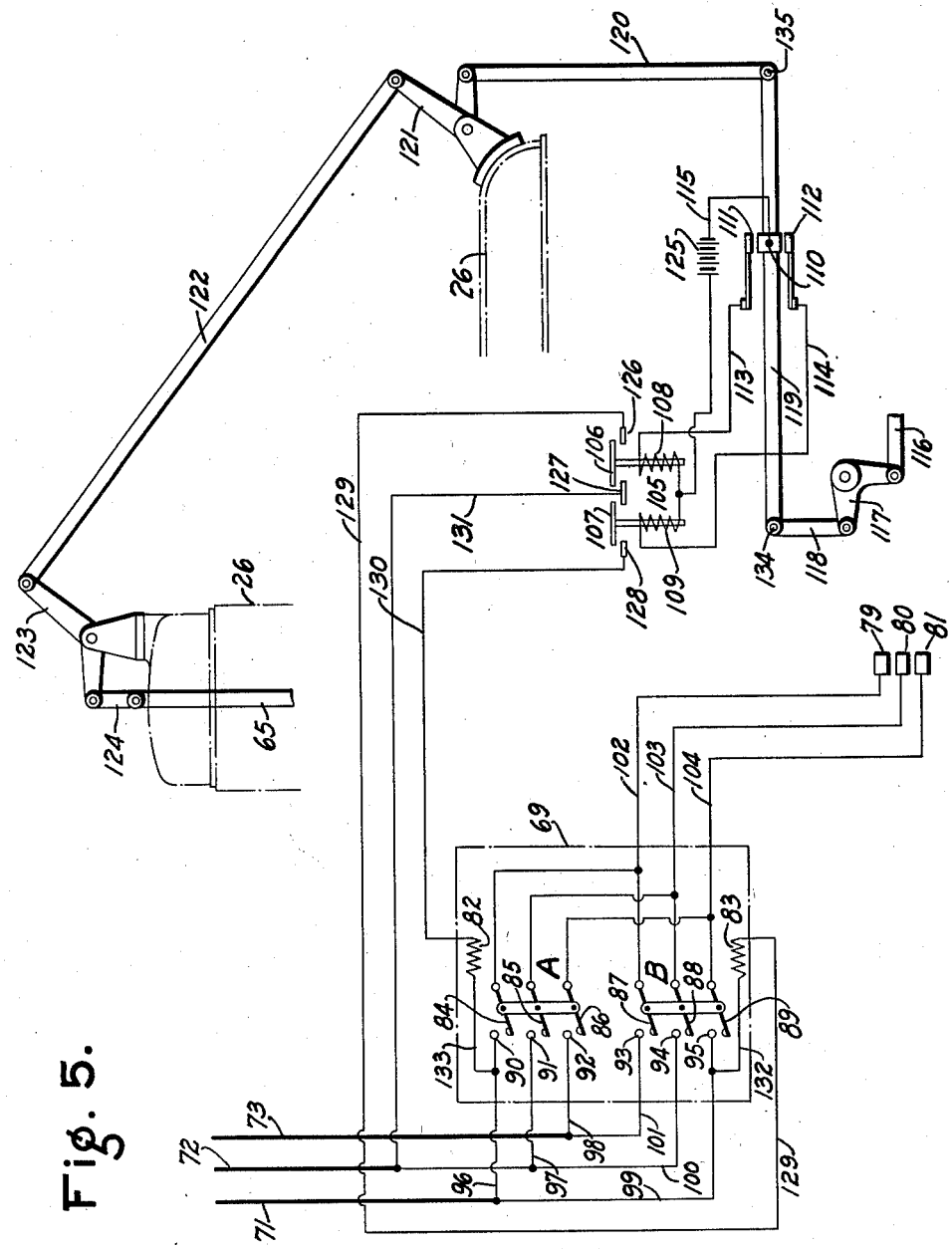

Patented July 24, 1934

1,967,302

UNITED STATES PATENT OFFICE 1,967,302

HYDRAULIC TURBINE

Malcolm F. Gannett, Springettsbury Township, York County, Pa., assignor to S. Morgan Smith Company, York, Pa., a corporation of Pennsylvania Application March 11, 1933, Serial No. 660,372

14 Claims. (Cl. 253—148)

This invention relates to improvements in hydraulic turbines of the Kaplan type wherein the blades of the runner are adjustable to vary their angle and the area of the water opening through the runner to correspond with the angle and opening of the wicket gates or guide vanes which control the admission of water to the runner.

An object of the invention is to provide an improved hydraulic turbine of the Kaplan type in which means are provided by which the operating mechanism for the runner blades is actuated under the control of the wicket gate or guide vane controlling means, so that when the wicket gates are adjusted, the relative position of the runner blades will also be correspondingly adjusted and thereby maintain a definite relationship between the angle or position of the wicket gates and the angle or position of the runner blades at all times.

Another object of the invention is to provide an improved turbine of the above type in which the runner blade adjusting mechanism is operated by an electric motor which is under the control of the wicket gate controlling mechanism.

Another object of the invention is to provide an improved electrical system for controlling the operation of a hydraulic turbine of the Kaplan type having an electric motor operated runner blade adjusting mechanism.

Another object of the invention is to provide an improved turbine of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Fig. 5 is a diagrammatic view of the electric control system shown in Fig. 1.

The present invention is applicable to hydraulic turbine installations of the general class employing a runner having blades or buckets which are rotatable or adjustable so that their angle is variable with respect to the runner axis. A turbine of this type is shown and described in United States Letters Patent No. 1,467,672 granted September 11, 1923 to Victor Kaplan.

Turbines of the type shown in the above mentioned patent have recently gone into extensive use in hydroelectric installations where the head of water is comparatively low, since these turbines have a high efficiency over a greater range than the turbines heretofore in use.

While in the instant case the invention is shown applied to a turbine installation of one particular type, it will be understood that the invention is not restricted thereto, since the invention is applicable to turbine installations of other types.

Figure 1:
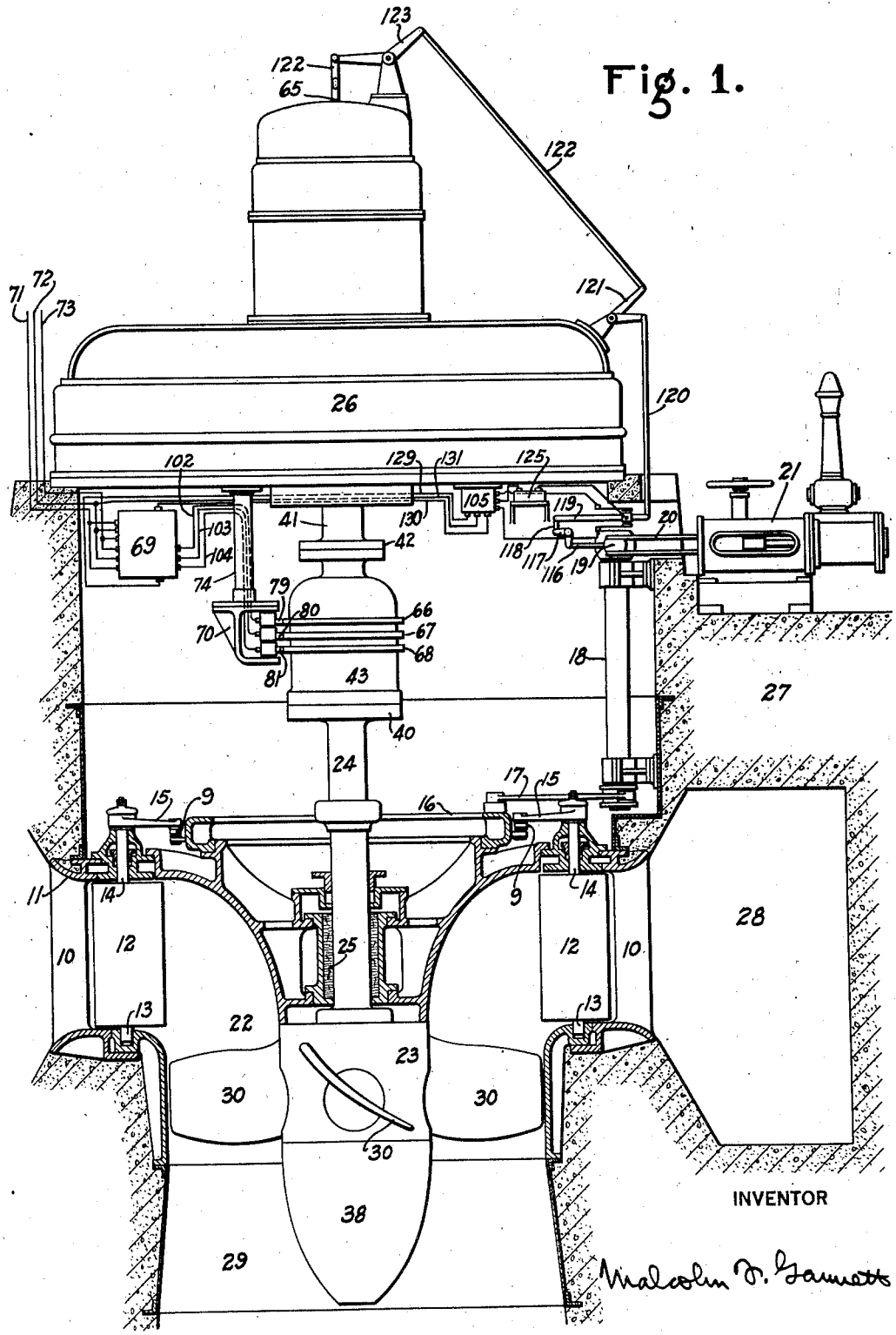
Figure 1 is a side elevation, partly in section, of a hydraulic turbine employing a runner of the adjustable blade type and embodying blade adjusting and controlling means according to the present invention.

Referring to the drawings, and especially to Fig. 1, the improved turbine comprises a casing 11 which forms a peripheral water inlet in which are mounted an annular series of movable wicket gates 12 and stationary guide vanes 10. Projecting from the lower ends of the wicket gates 12, are trunnions 13 which are journalled in the adjacent portion of the casing 11. Likewise, stems 14 project upward from the wicket gates 12. The stems 14 are journalled in suitable bearings carried by the casing 11 and terminate a suitable distance thereabove.

The wicket gates 12 are adapted to be rotated simultaneously into different angular positions to control the flow of water into the turbine in a well known manner, and for this purpose the upper ends of the stems 14 are usually provided with gate operating arms 15 which are fixed to said stems and connected by means of links 9 to a gate adjusting ring 16.

The gate adjusting ring 16 is connected by link means 17 to a shaft 18 which is usually vertically disposed, as shown at the right in Fig. 1. Fixed to the upper end of the shaft 18, is an arm 19 which is connected by a link 20 to the controlling member of a governor 21. If so desired, the governor 21 may be of the usual type employed with turbines to adjust the gates thereof during the running of the turbine and thereby maintain the turbine at its rated speed notwithstanding variations in the load thereon.

The lower end of the turbine casing forms an axially directed chamber 22 in which the runner 23 operates.

The hub of the runner 23 is fixed to the lower end of a hollow or tubular shaft 24 which is journalled in a suitable bearing 25 in the upper portion of the turbine casing. The upper end of the runner shaft 24 is connected to the part to be driven. In the present instance, the shaft 24 is connected to the shaft 41 of an electric generator 26 which is mounted in superposed position above the turbine.

Any suitable type of setting may be used for the turbine installation, a concrete setting 27 being shown in the present instance. This setting forms a scroll case 28 which surrounds the turbine inlet and is connected to receive water from a flume or other source of supply. The portion of the setting below the turbine forms a draft tube 29 into which the water is discharged from the runner. The electrical generator 26 may rest on the top of the setting as shown.

Figure 2:
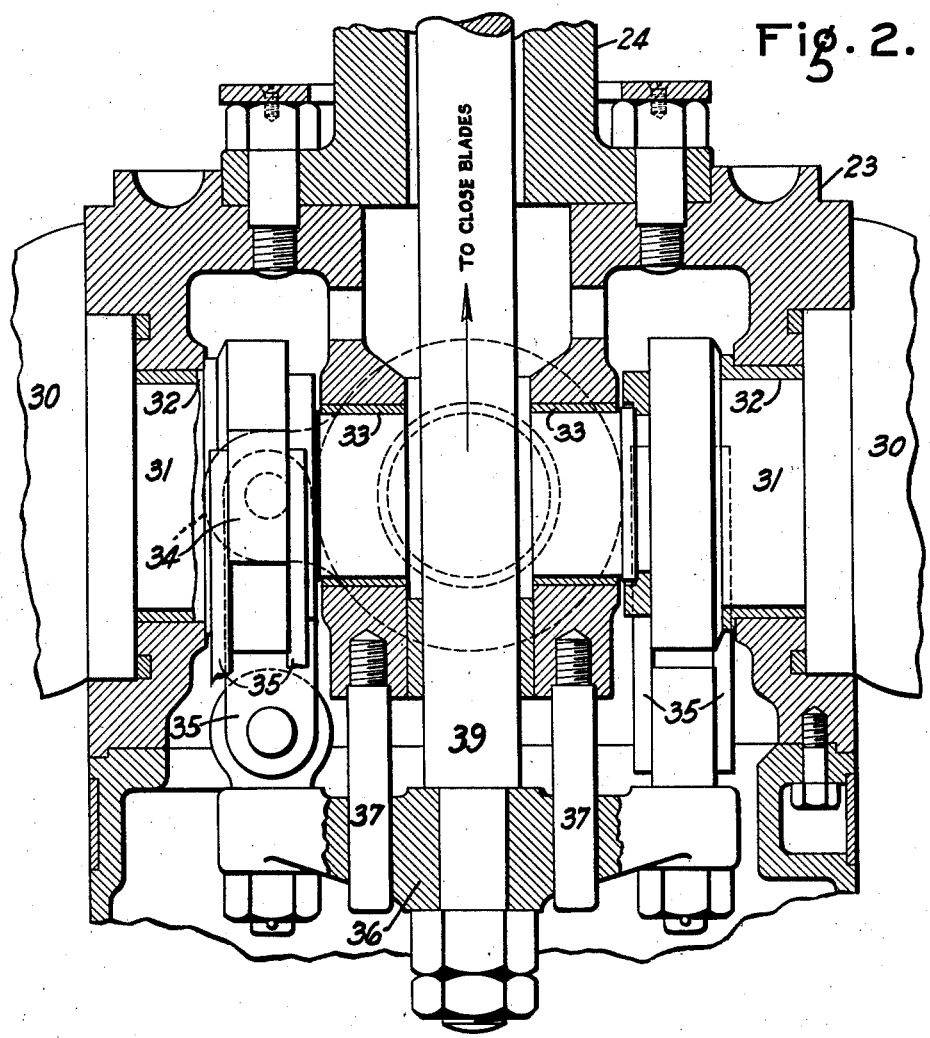
Fig. 2 is an enlarged vertical section of the lower end of the runner shaft, showing the construction of the parts within the hub of the runner.

As shown in Fig. 2, the hub of the runner 23 is bolted or otherwise fixed to the lower end of the runner shaft 24. A suitable number of blades 30 are rotatably supported in the hub of the runner 23 and project radially therefrom. In the present instance four blades are shown (see also Fig. 1).

The inner end of each blade 30 is formed with a trunnion 31 which is journalled in bearings 32 and 33 supported in the hub. The construction is such that the blades are rotatable into different angular relationships with the axis of the runner.

Means are provided for simultaneously rotating all of the blades 30 and for maintaining them in equal angular relationships, such means comprising preferably an arm 34 rigidly fixed on the trunnion 31 of each blade and links 35 which pivotally connect the arms 34 to a cross head 36. The cross head 36 is guided to reciprocate in a direction axially of the runner by guide pins 37 which are mounted in the hub of the runner in the manner shown in Fig. 2.

It will be understood that the relative positions of the blades 30 governs the area of the water passages or openings between the blades, and that when the blades are rotated, the area of the water passages is increased or decreased depending upon the direction in which the blades are moved.

As shown in Fig. 1, a cap 38 is bolted or otherwise removably secured to the lower end of the hub of the runner 23. Since the hub of the runner is otherwise enclosed and the hub is hollow, the cap 38 provides a closed chamber or reservoir for containing a supply of grease for lubricating the various working parts of the mechanism contained within the hub of the runner.

Figure 3:
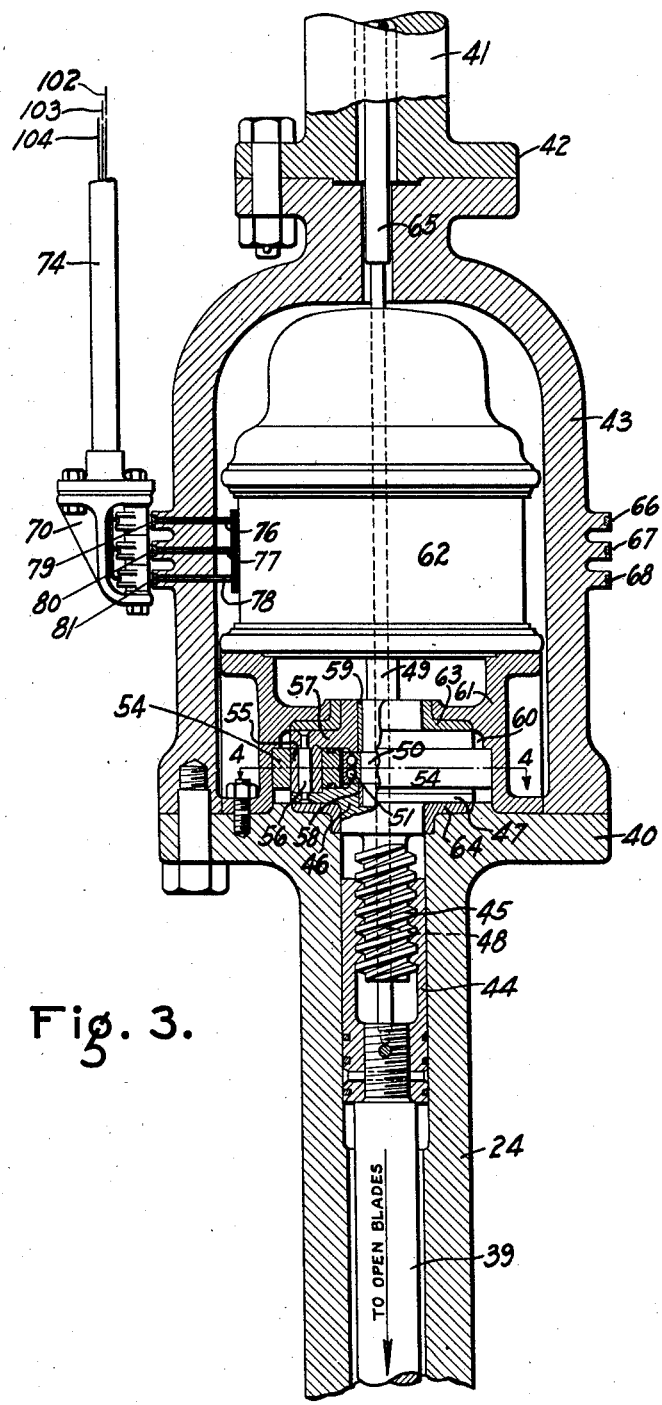
Fig. 3 is a vertical section on an enlarged scale of a portion of the runner shaft, showing the mechanism for operating the runner blade adjusting means.

As shown in Figs. 1 and 3, the upper end of the runner shaft 24 is formed with a flange 40. The lower end of the shaft 41 of the generator 26 is also formed with a flange 42. The shafts 24 and 41 are so made that when the parts are assembled a gap is provided between the ends of said shafts. Interposed in this gap is a dome-shaped hollow casing 43, the lower peripheral edge of which is bolted or otherwise secured to the flange 40 of the runner shaft 24, and the upper portion of which is likewise secured to the flange 42 of the generator shaft 41, so that rotation of the runner shaft 24 will be transmitted to the shaft 41 of the generator 26. The casing 43 constitutes an enlargement of the runner shaft for the purpose to be hereinafter described.

Disposed within the dome-shaped casing 43 is an electric motor 62 which is adapted, through mechanism to be hereinafter described, to operate the runner blade adjusting mechanism in the hub of the runner 23. The operation of the motor 62 is controlled by suitable means to be hereinafter described, so that when the wicket gates 12 are adjusted, a corresponding adjustment or repositioning of the runner blades will also be effected.

Since the runner blades are adjusted by slowly moving the cross head 36 either upwardly or downwardly, and since it is of advantage to employ an electric motor of standard design, which motors usually have a comparatively high speed, it is necessary to provide means in the mechanism which is employed to operatively connect the electric motor with the cross head 36, for reducing the speed from the motor sufficiently to effect the desired slow movement of the cross head 36.

As shown in Fig. 2, the cross head 36 is bolted or otherwise fixed to the lower end of an operating rod 39 which extends upwardly through the hollow runner shaft 24.

As shown in Fig. 3, the upper end of the rod 39 is fixed to an internally threaded sleeve 44 which is slidably mounted in the bore of the runner shaft 24. Fitted to the sleeve 44, is a screw 45, which is connected to the driven member 46 of a speed reducer 47. Formed axially through the screw 45, is a bore 48.

Speed reducers of different kinds may be used, that shown being of the type shown and described in United States Letters Patent No. 1,543,791 granted June 30, 1923 to W. C. Pitter.

Figure 4:
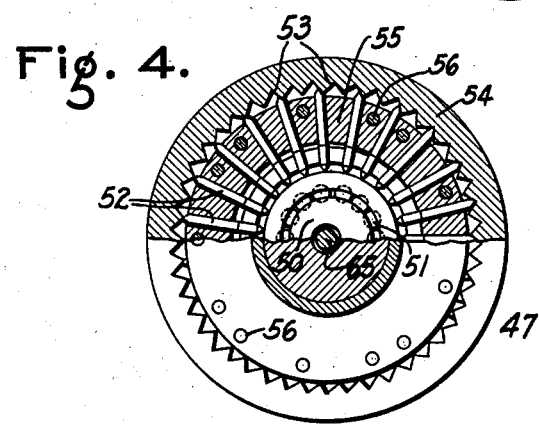
Fig. 4 is a transverse section taken on the line 4—4 of Fig. 3.

As shown in Figs. 3 and 4, the speed reducer comprises a driving member in the form of a shaft 49, and the driven member 46 heretofore referred to. The driving member or shaft 49, which may be the shaft of the motor 62, has an eccentric 50 thereon which supports a ball bearing or other anti-friction bearing 51.

The outer member or race of the ball bearing 51 is surrounded by a series of radially disposed plungers 52. The inner ends of the plungers 52 bear on the outer race of the bearing 51 and the outer ends of said plungers are arranged to co-operate with teeth 53 formed concentrically within the outer or stationary member 54. Both ends of the plungers 52 are bevelled, and the teeth 53 are bevelled.

The number of teeth 53 differs from the number of plungers 52 so that rotation of the eccentric 50 will cause the plungers 52 to be forced outwardly in succession around the circular series of teeth 53, and in consequence will cause the plungers to creep around within the stationary member 54.

The plungers 52 are guided to reciprocate in a member 55 which is fixed to the driven member 46 by pins 56 so that the creeping motion of said plungers around the toothed interior of the stationary member 54 will be transmitted to the driven member 46. The motion of the driving member 49 is thus transmitted to the driven member 46, but at a great reduction in speed ratio.

The pins 56 may also secure the head 57 of the speed reducer to the driven member 46 thereof, as shown in Fig. 3.

Cavities are formed in the driven member 46 and head 57 for bushings 58 and 59, respectively. These bushings constitute bearings in which the driving member or shaft 49 revolves.

The speed reducer may be mounted in a chamber 60 which is formed within a supporting member 61 for the electric motor 62 heretofore referred to, thrust bearings 63 and 64 being provided for supporting the rotating parts of the speed reducer, and the outer member 54 is keyed or otherwise fixed within the member 61, as shown in Fig. 3.

The driving member or shaft 49 of the speed reducer 47 is connected to the armature or other rotating part (not shown) of the motor 62 so that the speed reducer will be actuated by said motor, and since the driven member 46 of the speed reducer and the screw 45 are directly connected together, the rod 39 will be operated by the sleeve 44, which is associated with the screw 45, to effect changes in the angular positions of the runner blades 30 in the manner to be hereinafter more fully described.

As shown in Figs. 1, 3 and 5, a restoring rod 65, which is fixed to the upper end of the operating rod 39, extends upwardly through the apparatus and terminates a suitable distance above the top of the generator 26. It will be understood, that in addition to the bore 48 in the screw 45, suitable openings are formed in the reducing gear 46, shaft 49, and generator 26, through which the restoring rod 65 may freely pass, so that when the rod 39 is actuated to effect changes in the positions of the runner blades, the restoring rod will be free to move either upwardly or downwardly therewith.

Preferably the electric motor 62 is a three-phase alternating current induction motor which is adapted to be supplied with electric current from three conductors 71, 72 and 73 in such a manner that the motor will operate in either direction. The conductors 71, 72 and 73 constitute a main power line for supplying high voltage electric current to the apparatus from a suitable source of supply.

When the motor 62 operates in one direction, the screw 45, which is rotated in the same direction as the direction of rotation of the shaft 49, will, through the sleeve 44, cause a rectilinear movement of the rod 39 in one direction, and when the motor 62 operates in the other direction, the rod 39 will be moved in the opposite direction, due to the reversed movements imparted to the reducing gear 41 and screw 45 by the motor.

As shown by the arrow, Fig. 2, when the rod 39 moves upwardly, the runner blades 30 are moved toward closed position, and as shown by the arrow, Fig. 3, the runner blades are moved toward open position when the rod 39 moves downwardly.

The construction of the reducing gear 47, screw 45, and sleeve 44 is such that, when the shaft 49 is rotated by the motor 62 in a clockwise direction, the runner blades will be moved toward closed position, and when the motor is reversed and the shaft 49 is rotated in a counterclockwise direction, the runner blades will be moved toward open position.

The casing 43 carries a plurality of collector rings 66, 67 and 68, which are connected to the motor 62 by conductors 76, 77 and 78, respectively. The collector rings are preferably mounted on annular ribs or bands which are formed on the exterior of the casing 43, and the conductors are preferably contained within insulated cables which are inserted through suitable openings formed in the wall of the casing, as shown in Fig. 3.

Associated with the collector rings 66, 67 and 68, are brushes 79, 80 and 81 respectively. These brushes are supported by a suitable bracket 70 which is suspended from the casing of the generator 26, or from any other suitable support, by a tube or pipe 74 (see Fig. 1).

For the purpose of controlling the motor 62, a magnetic reversing switch device 69 is utilized.

As shown diagrammatically in Fig. 5, the switch device 69 comprises two sets of movable switch elements or blades A, B, which are adapted to be operated by magnets 82 and 83 respectively. The magnet 82 is associated with the switch A comprising the switch elements 84, 85 and 86, and the magnet 83 is associated with the switch B comprising the switch elements 87, 88 and 89.

The movable switch elements 84, 85 and 86 are adapted to engage electrical contacts 90, 91 and 92 respectively, and the movable switch elements 87, 88 and 89 are adapted to engage electrical contacts 93, 94 and 95, respectively.

The construction of the switch device 69 is such that when the magnet 82 is energized, the switch elements 84, 85 and 86 will be simultaneously operated to engage the contacts 90, 91 and 92, respectively, and thereby close a circuit through which electric current is supplied to the motor 62 for operating said motor in one direction, and when the magnet 83 is energized, the switch elements 87, 88 and 89 will be simultaneously operated to engage the contacts 93, 94 and 95, respectively, so that a circuit will be closed through which current is supplied for operating the motor 62 in the opposite direction. As will be hereinafter more fully described, means are provided for controlling the circuits of the magnets 82 and 83 in such a manner that when current is supplied for energizing one magnet, the other magnet will remain deenergized.

The conductors 71, 72 and 73, heretofore referred to, are connected to the contacts 90, 91 and 92 by conductors 96, 97 and 98, respectively, and to the contacts 95, 94 and 93 by conductors 99, 100 and 101, respectively.

The switch elements 84 and 87, 85 and 88 and 86 and 89, are respectively connected to the brushes 79, 80 and 81, by conductors 102, 103 and 104.

A pilot device 105 is provided for controlling the circuits through which current is supplied for operating the magnets 82 and 83 of the reversing switch device 69.

As shown in Fig. 5, the pilot device 105 comprises two switch members 106 and 107, which are operated, respectively, by relays 108 and 109.

The pilot device 105 is adapted to be controlled by the governor 21 and also by the runner blade operating mechanism.

The link 20 of the governor 21 is connected by a link 116, bell crank 117, and link 118, to one end of a floating lever 119. The other end of the lever 119 is connected by a link 120, bell crank 121, link 122, bell crank 123, and link 124, to the restoring rod 65 heretofore referred to. The construction is such that one end of the floating lever 119 is raised or lowered when the governor 21 operates to vary the angle or opening of the wicket gates 12, and the other end of said lever is raised or lowered when the runner blade adjusting mechanism is operated to vary the positions of the runner blades.

The floating lever 119 carries, at a point between its ends, an electrical contact 110, which contact is disposed between a pair of electrical contacts 111 and 112. The arrangements of the parts is such that the lever 119 will have a limited motion between the contacts 111 and 112, before the contact 110 engages either contact 111 or 112, so that the contact 110 may occupy a position between and out of engagement with the contacts 111 and 112.

The contact 111 is connected by a conductor 113 to one terminal of the relay 108, and the contact 112 is connected by a conductor 114 to one terminal of the relay 109. The switch contact 110 is connected to the other terminals of the relays 108 and 109, by a conductor 115.

The relays 108 and 109 are adapted to be energized by low-voltage electric current, as supplied from a storage battery 125, which is connected to the conductor 115 in the manner shown in Fig. 5.

The switch member 106 is adapted to engage contacts 126 and 127, and the switch member 107 is adapted to engage the contact 127 and a contact 128.

The contact 126 is connected to one terminal of the magnet 83 of the reversing switch device 69, by a conductor 129, and the contact 128 is connected to one terminal of the magnet 82 of said reversing switch device, by a conductor 130. The contact 127 is connected to the conductor 72 heretofore referred to, by a conductor 131. The other terminal of the magnet 83 is connected to the conductor 99 heretofore referred to, by a conductor 132, and the other terminal of the magnet 82 is connected to the conductor 96, by a conductor 133.

In operation, when the governor 21 operates to swing the wicket gates 12 toward open or closed position to vary the gate opening to conform with variations in the load on the turbine, the link 116, will, through the bell crank 117 and link 118, operate the floating lever 119, and move the movable contact 110 into engagement with either of the contact members 111 or 112, according to the direction in which the governor operates, thereby closing the electrical circuit through which either the relay 108 or 109 is energized by low-voltage current from the storage battery 125.

For instance, when the governor 21 operates to move the wicket gates toward open position, the link 116 will be moved toward the right (Fig. 5), and the floating lever 119 will, through the bell crank 117 and link 118, be swung downwardly about the fulcrum provided by the pivot pin 135. The movable contact 110 will be moved into engagement with the contact 112, thereby closing the electrical circuit through which the relay 109 is energized. On the other hand, when the governor 21 operates to move the wicket gates toward closed position, the floating lever 119, will be swung upwardly about the fulcrum provided by the pivot pin 135 and the contact 110 will be moved into engagement with the contact 112, thereby closing the electrical circuit through which the relay 108 is energized.

When the relay 109 is energized, the switch member 107 is engaged with the contacts 127 and 128, and the circuit is closed through which high voltage electric current is supplied for energizing the magnet 82.

With the energization of the magnet 82, the switch A will be operated so that the switch blades 84, 85 and 86 engage the contacts 90, 91 and 92, respectively, and close the circuit from the high voltage conductors 71, 72 and 73, to the brushes 79, 80 and 81, respectively. The motor 62, will then rotate in a counter clockwise direction and its motion is transmitted through the speed reducer 47 to the screw 45. The screw 45, rotating in a counter clockwise direction at greatly reduced speed within the threaded sleeve 44, will lower the operating rod 39 (see Fig. 3), and said rod will correspondingly lower the cross head 36. The cross head 36, acting through the links 35 and arms 34 hereinbefore described, will simultaneously rotate the runner blades 30 about their trunnions as axes toward open position.

When the relay 108 is energized, the switch member 106 is engaged with the contacts 126 and 127, and the circuit is closed through which high voltage current is supplied for energizing the magnet 83.

When the magnet 83 is energized, the switch B will be operated so that the switch blades 87, 88 and 89 engage the contacts 93, 94 and 95, respectively, and close the circuit from the high voltage conductors 73, 72 and 71, to the brushes 79, 80 and 81, respectively. The motor 62, will then rotate in a reverse or clockwise direction, and its motion is transmitted through the speed reducer 47 to the screw 45. The screw 45, rotating in a clockwise direction at greatly reduced speed within the threaded sleeve 44, will raise the operating rod 39, and said rod will correspondingly raise the cross head 36. The cross head 36, acting through the links 35 and arms 34, will simultaneously rotate the runner blades 30 about their trunnions as axes toward closed position.

Since the restoring rod 90 is connected to the floating lever 119 and moves downwardly or upwardly while the runner blades are moving toward open or closed position, respectively, the floating lever is moved in the direction in which the contact 110 is moved from the contact 112 or 111 with which it is in contact, so that the circuit through which the magnet 82 or 83 is energized is opened, and said magnets are de-energized, thereby permitting either the switch A or B to open and break the motor circuit.

The movement of the governor 21, in response to a change in load on the turbine, not only moves the wicket gates toward open or closed position to compensate for the variation in load and thereby maintain constant the speed of the runner, but it also acts through the link 116, bell crank 117, and link 118, to move the left hand end of the floating lever 119 in a corresponding direction, so that the runner blade adjusting mechanism is also operated as has been described. Since the right hand end of the lever 119 is connected to the restoring rod 65 and the restoring rod moves in accordance with the adjustments of the runner blades, the end of the restoring rod through the link 120, bell crank 121, link 122, bell crank 123, and link 124, will be shifted in a direction opposite to that in which the other end of said lever is shifted by the governor 21, so that as soon as the runner blade adjusting mechanism has commenced to operate in accordance with the movement of the wicket gates 12, the movement applied to one end of the lever 119 by the restoring rod 65 will counteract the effect of the movement of the opposite end of said lever by the governor 21.

Thus, if the governor 21 moves the left hand end of the lever 119 (Fig. 5) upwardly, as for example, in moving the wicket gates 12 toward closed position, this upward movement will take place around the pin 135 as a pivot and will cause engagement of the contact 110 with the contact 111. While the wicket gates are still moving the runner blades start to move through the operation of the runner blades adjusting mechanism, and the right hand end of the lever 119 will have a downward motion around the pin 134 at the left end of the lever as a pivot. The opposite motions thus imparted to the opposite ends of the lever 119 counteract the effect of the motion of the left hand end of the lever on the switch contacts. The movement of the left hand end of the lever 119 is definitely limited by the governor 21, but the opposite or right hand end of the lever will continue to move as long as the contact 110 is in engagement with the contact 111. Therefore, the right hand end of the lever 119 will continue its downward motion until the switch contact 110 is in disengaged position between the contacts 111 and 112. The magnet 83 which was energized is then de-energized, so that the switch B opens the motor circuit. The operation of the runner blade adjusting mechanism will then be interrupted or arrested. The runner blades will then have been brought to an angle or position corresponding with the adjusted position into which the wicket gates have been brought by the governor 21.

The operation is similar when the governor 21 moves the gates toward open position, the ends of the lever 119, however, being moved by the governor and restoring rod 65 in directions opposite to those stated above, and the runner blade adjusting mechanism being set into operation to move the runner blades toward open position by the motor 62 under the control of the relay 109 and magnet 82.

The present invention as hereinbefore described provides novel and improved means whereby the adjustable runner blades of a hydraulic turbine may be opened or closed to conform with the opening or closing of the wicket gates by the usual governor, to maintain the speed of the turbine constant under increased or decreases in load, so that the runner blades may always occupy an angle or position which corresponds with a definite position of the wicket gates as determined by the output of the turbine.

Since the magnet 83 is controlled by the relay 109, and the magnet 84 is under the control of the relay 108, and since said relays are adapted to be individually controlled by the operation of the floating lever 119, it will be obvious that when the floating lever is operated by the governor 21 in one direction, the result will be that only one of the relays will operate to close the circuit of the magnet associated therewith, and when the floating lever is operated in the other direction by the governor, the other relay will operate to close the circuit of the other magnet. In this way when one magnet is active, the other magnet will remain inactive, so that only one circuit through which high voltage current is supplied to the motor 62 will be closed at one time.

While one illustrative embodiment of the invention has been described in detail, it is not my intention to limit its scope to that embodiment or otherwise than by the terms of the appended claims.

Having thus described my invention what I claim as new and desire to secure by Letters Patent is:—

1. In a hydraulic turbine, a runner having blades movable into different angular positions, gates movable into different angular positions and controlling the flow of the driving fluid to the runner, a governor for adjusting the angular positions of the gates, mechanism for adjusting the positions of the runner blades, a rectilinearly movable rod operatively connected with said runner blade adjusting mechanism, said rod being movable in opposite directions, an electric motor for actuating said blade adjusting mechanism, electric circuits for conducting electric current to said motor for operating the motor in either direction, electrically operated switches for controlling said electric circuits, a relay for controlling each of said switches, a switch for controlling each of said relays, and a floating lever operatively connected with said governor and said rod for operating said relay switches.

2. In a hydraulic turbine, a runner having blades movable into different angular positions, gates movable into different angular positions and controlling the flow of the driving fluid to the runner, a governor for adjusting the angular positions of the gates, mechanism for moving the runner blades, a rectilinearly movable rod connected to the runner blade mechanism, an electric motor for operating said runner blade mechanism in either direction, magnetic switches for controlling said motor, one of said switches being operative to control the operation of said motor in one direction and the other switch being operative to control the operation of the motor in the opposite direction, and means operatively connected to the governor and said rod for controlling said switches.

3. In a hydraulic turbine, a runner having blades movable into different angular positions, gates movable into different angular positions and controlling the flow of the driving fluid to the turbine, a governor for adjusting the angular positions of the gates, mechanism for adjusting the runner blades, said mechanism being operable in opposite directions, an electric motor for operating said runner blade adjusting mechanism, magnetic switches for controlling the motor, one of said switches being operative to control the operation of the motor in one direction and the other said switch being operative to control the operation of the motor in the opposite direction, and means controlled by the governor and said runner blade adjusting mechanism for selectively controlling each of said switches.

4. In a hydraulic turbine, a runner having blades movable into different angular positions, gates movable into different angular positions and controlling the flow of the driving fluid to the runner, a governor for adjusting the angular positions of the gates, mechanism for adjusting the runner blades, an electric motor for operating said runner blade adjusting mechanism in either direction, electrically operated switches for controlling the motor, one of said switches being operative to control the operation of the motor in one direction and the other switch being operative to control the operation of the motor in the opposite direction, a pilot switch device having means for selectively controlling each of said electrically operated switches, and means operatively connected with said governor and said runner blade adjusting mechanism for controlling the pilot switch device.

5. In a hydraulic turbine, a runner having blades movable into different angular positions, gates movable into different angular positions and controlling the flow of the driving fluid to the runner, a governor for adjusting the angular positions of the gates, mechanism for adjusting the runner blades, an electric motor for operating said runner blade adjusting mechanism in either direction, electrically operated switches for controlling the motor, one of said switches being operative to control the operation of the motor in one direction and the other switch being operative to control the operation of the motor in the opposite direction, a pilot switch device having means for selectively controlling each of said electrically operated switches, a switch device for controlling said pilot switch and including a floating lever, means connecting one end of said lever with the governor and means connecting the other end of said lever with said runner blade adjusting mechanism, whereby a change of position of either the runner blades or the gates will operate said last named switch device.

6. In a hydraulic turbine, a runner having blades movable into different angular positions, gates movable into different angular positions and controlling the flow of the driving fluid to the runner, a governor for adjusting the angular positions of the gates, mechanism for adjusting the runner blades, a reversible electric motor for operating the runner blade adjusting mechanism in either direction, a pair of electrically operated switches for controlling the circuits through which electric current is supplied to operate the motor in both directions, a pilot switch device comprising two switches for selectively controlling the operation of said electrically operated switches, a relay for controlling each switch of the pilot device, a switch for controlling each of said relays, and a floating lever operatively connected with said governor and said runner blade adjusting mechanism for operating said relay controlling switches.

7. In a hydraulic turbine, a runner having blades movable into different angular positions and controlling the flow of the driving fluid to the runner, a governor for adjusting the angular positions of the gates, mechanism for adjusting the runner blades, a reversible electric motor for operating the runner blade adjusting mechanism in either direction, a pair of electrically operated switches for controlling the circuits through which electric current is supplied to operate the motor in both directions, a pilot switch device comprising two switches for selectively controlling the operation of said electrically operated switches respectively, a relay for controlling each switch of the pilot device, a switch for controlling said relays, a floating lever for operating said last named switch, means operatively connecting one end of said floating lever with the governor, and means operatively connecting the other end of said floating lever with the runner blade adjusting mechanism, whereby a change of position of either the runner blades or the gates will operate said last named switch.

8. In a hydraulic turbine, a shaft, a runner connected to said shaft and having blades movable into different angular positions, gates movable into different angular positions and controlling the flow of the driving fluid to the runner, a governor for adjusting the angular positions of the gates, mechanism in the hub of the runner for adjusting the runner blades, an electric motor mounted in the shaft and operatively connected to said runner blade adjusting mechanism for operating the same in either direction, a reversible magnetic switch for controlling the operation of said motor, and a pilot switch device associated with the governor for controlling said magnetic switch.

9. In a hydraulic turbine, a runner having blades movable into different angular positions, gates movable into different angular positions and controlling the flow of the driving fluid to the runner, a governor for adjusting the angular positions of the gates, mechanism operative to move the runner blades in either direction, a reversible electric motor for operating said mechanism, a pair of electrically operated switches for controlling the circuits through which electric current is supplied to operate the motor, and means controlled by the governor for selectively controlling said switches.

10. In a hydraulic turbine, a runner having blades adjustable to different angular positions, gates adjustable to different angular positions for controlling the flow of driving fluid to the runner, means for adjusting the angular position of the gates, mechanism for adjusting the angular position of the runner blades, electro-magnetic means for controlling the operation of said blade adjusting mechanism, a pilot device for controlling the operation of said electro-magnetic means, and means controlled by said gate adjusting means and said runner blade adjusting mechanism for controlling the operation of said pilot device.

11. In a hydraulic turbine, a runner having blades movable into different angular positions, movable wicket gates operatively associated with the runner for controlling the flow of driving fluid to the runner, a governor device operative by variations in load on the turbine for controlling the positions of said wicket gates, a shaft connected to the runner, an enlarged hollow casing connected to said shaft and rotatable therewith, an electric motor mounted in said casing, mechanism in the runner for moving the runner blades, means operatively connecting said motor with said mechanism, a magnetic reversing switch, conductors leading from said switch for conducting electric current to the motor, a pilot switch device for controlling the circuits through which electric current is supplied for operating the magnets of the reversing switch, and means operatively connected to the governor device and to the runner blade operating mechanism for controlling the pilot switch device.

12. In a hydraulic turbine, a runner having adjustable blades, mechanism for adjusting the runner blades, a reversible electric motor for operating said mechanism to adjust the blades in either direction, magnetic reversing switches for controlling the motor, a pilot device for controlling the electric circuits through which current is supplied for operating the magnets of the reversing switch, said pilot device comprising a pair of switch members and relays for operating said switch members respectively, and means for selectively controlling the circuits through which the relays are energized.

13. In a hydraulic turbine, a rotating shaft, runner blades carried thereby and adjustable upon their axes, an electric motor carried by the shaft, operative connections between said motor and said blades for turning the blades upon their axes, a magnetically operated device for controlling the operation of the motor in either direction, an electric means operated by a change in load on the turbine for operating said control device to start said motor and to stop the same after the blades reach a position of adjustment corresponding to the change in load.

14. In a hydraulic turbine, a runner having blades movable into different angular positions, gates movable into different angular positions and controlling the flow of the driving fluid to the runner, a governor responsive to variations in the load on the turbine for adjusting the angular positions of the gates, mechanism for adjusting the positions of the runner blades, an electric motor for actuating said blade adjusting mechanism, a magnetically operated device for controlling the operation of the motor in either direction, and electric means operatively connected with said governor and said blade adjusting mechanism for operating said control device to start said motor when said gates are adjusted in accordance with a change in load on the turbine and to stop the motor after the runner blades reach a position of adjustment corresponding to the change in position of the gates.

MALCOLM F. GANNETT.